(12) United States Patent
Wang et al.

(10) Patent No.: US 10,165,210 B1
(45) Date of Patent: Dec. 25, 2018

(54) BITLINE SETTLING IMPROVEMENT BY USING DUMMY PIXELS FOR CLAMP

(71) Applicant: OmniVision Technologies, Inc., Santa Clara, CA (US)

(72) Inventors: Rui Wang, San Jose, CA (US); Hiroaki Ebihara, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/909,267

(22) Filed: Mar. 1, 2018

Related U.S. Application Data

(60) Provisional application No. 62/610,072, filed on Dec. 22, 2017.

(51) Int. Cl.
| | | |
|---|---|---|
| *H04N 3/14* | (2006.01) | |
| *H04N 5/335* | (2011.01) | |
| *H04N 5/367* | (2011.01) | |
| *H04N 5/378* | (2011.01) | |
| *H04N 5/217* | (2011.01) | |
| *H04N 5/235* | (2006.01) | |
| *H04N 5/369* | (2011.01) | |
| *H04N 5/357* | (2011.01) | |
| *H04N 5/3745* | (2011.01) | |

(52) U.S. Cl.
CPC ......... *H04N 5/3675* (2013.01); *H04N 5/2176* (2013.01); *H04N 5/2355* (2013.01); *H04N 5/3575* (2013.01); *H04N 5/3698* (2013.01); *H04N 5/378* (2013.01); *H04N 5/37455* (2013.01)

(58) Field of Classification Search
CPC .... H04N 5/2173; H04N 5/2176; H04N 5/235; H04N 5/2355; H04N 5/357; H04N 5/3575; H04N 5/367; H04N 5/3675; H04N 5/374; H04N 5/37455; H04N 5/378
USPC .............. 348/294, 308–310; 250/208.1
See application file for complete search history.

(56) References Cited

U.S. PATENT DOCUMENTS

| | | | | |
|---|---|---|---|---|
| 4,654,831 A | * | 3/1987 | Venkatesh | G11C 7/062 365/185.21 |
| 8,120,677 B2 | * | 2/2012 | Ukita | H04N 5/378 348/241 |
| 8,149,304 B2 | * | 4/2012 | Murakami | H04N 5/378 250/208.1 |

(Continued)

*Primary Examiner* — Ngoc Yen T Vu

(57) ABSTRACT

A photodiode is adapted to accumulate image charges in response to incident light. A transfer transistor is coupled between the photodiode and a floating diffusion to transfer the image charges accumulated in the photodiode to the floating diffusion. A reset transistor is coupled to supply a supply voltage to the floating diffusion. A source follower transistor is coupled to receive voltage of the floating diffusion from a SF gate terminal and provide an amplified signal to a source follower source terminal. A row select transistor is coupled to receive the amplified signal from the SF source terminal and output the amplified signal to a bitline. A bitline enable transistor controlled by a bitline enable voltage is coupled to link between the bitline and a bitline source node. The bitline is coupled to an idle voltage generator, a blacksun voltage generator, and a clamp voltage generator. These three voltage generators are each constructed out of a plurality of modified dummy pixels based on the dummy pixels in the dummy rows of an image sensor pixel array.

27 Claims, 6 Drawing Sheets

(56) References Cited

U.S. PATENT DOCUMENTS

| | | | | |
|---|---|---|---|---|
| 8,325,255 B2* | 12/2012 | Aruga | ............... | H04N 5/3598 |
| | | | | 348/294 |
| 8,982,252 B2* | 3/2015 | Kishi | ............... | H04N 5/3532 |
| | | | | 250/208.1 |
| 2018/0255258 A1* | 9/2018 | Shin | ............... | A61B 1/04 |

* cited by examiner

BITLINE SETTLING IMPROVEMENT BY USING DUMMY PIXELS FOR CLAMP

This application claims priority to U.S. patent application Ser. No. 62/610,072, title "BITLINE SETTLING IMPROVEMENT BY USING DUMMY PIXELS FOR CLAMP", filed Dec. 22, 2017, and incorporated herein by reference.

TECHNICAL FIELD

This disclosure relates generally to Complementary Metal-Oxide-Semiconductor (CMOS) image sensors, and in particular but not exclusively, relates to apparatus and method applied to photodiode pixel cells and their output line (bitline) in image sensor that is capable of fast settling the bitline during the readout of the image signal to reduce fixed pattern noise (FPN) and to maintain stability of the supply power.

BACKGROUND INFORMATION

Image sensors have become ubiquitous. They are widely used in digital still cameras, cellular phones, security cameras, as well as medical, automobile, and other applications. High dynamic range (HDR) image sensors have been required by many of those applications. Human eyes normally possess a dynamic range of up to about 100 dB. For automobile applications, an image sensor of more than 100 dB dynamic range to deal with different driving conditions, such as driving through a dark tunnel into bright sunlight, is often required.

HDR image sensors do not always perform HDR functions properly. Common drawbacks include image degradation due to fixed pattern noise (FPN), large random noise, reduced resolution associated with charge blooming, motion artifacts, fixed sensitivity, and lower fill factor when multiple photodiodes are used, where fill factor is a ratio of a pixel's light sensitivity area to its total area.

When image sensors are used, photo-generated electrons in each of the plurality of pixel cells are transferred from the photodiode (PD) to the floating diffusion (FD) for subsequent readout. The transfer (TX) transistor coupled between the PD and the FD is switched on and off under the control of a voltage pulse asserted to the TX gate terminal to enable this charge transfer. Due to an always-presented coupling capacitance between the TX gate terminal and the FD, the pulse signal asserted on the TX gate is always largely coupled to the FD. This is called TX feed-through. It ripples through a source follower (SF) transistor and a row select (RS) transistor to an output line, also called a bitline, of the pixel cell. Such a propagation of a large unwanted pulse is unavoidable and causes annoying FPN even for dark signals (which are signals caused by non-photo-generated, intrinsic electrons inside the pixel). For any given bitline, since it connects to all the pixels in the column, it possesses a significant amount of capacitive and resistive (RC) load. Therefore, any state changes on the bitline are unavoidably slow due to this RC delay. That is, once a status changes happen on the bitline, it takes a long time to settle to the newly updated step level. This is governed by the so-called RC time constant. For any given input step Vin, its settling time is governed by $$t_{settle} = \tau \cdot \ln\frac{V_{in}}{V_{0.5LSB}},$$

where time constant $\tau=RC$, and $V_{0.5LSB}$ is half the value of a single bit equivalent voltage.

One of the typical solutions to resolve this is to clamp the bitline voltage to limit its swing by using a clamp voltage generator. It helps suppressing the high-light-banding represented by voltages near its lower end. The goal is achieved by not allowing the bitline to drop below the clamped voltage limit. As a result, it reduces FPN under the high lighting conditions. However, this solution causes a large current variation to the power supply in react to each step voltage changes which in turn induces other unwanted performance issues on the sensor.

Another solution is to disconnect the pixel cell from its output line (bitline) during the charge transfer, also with the help of an added clamp voltage generator. The clamp voltage generator does not allow the bitline voltage to drop below a certain voltage level. Therefore, when the charge transfer takes place, the voltage change on bit lines can be reduced and settling time can be shortened. In addition, the total power supply (AVDD) current is maintained near constant by the clamp voltage generator to avoid large variations on the power supply. With this solution, after the RS transistor is switched back on again to reconnect the pixel output to the bitline, under complete dark condition which is correlated to the highest voltage, the bitline is charged by a pull-up-current through the SF transistor instead of being sunk by a pull-down-current of a relatively weak current source generator. Settling time is also reduced because the SF current is not limited by the current source generator. A faster pull up is always reached. That means, a faster settling on low lighting condition is clearly favored for this solution. Nevertheless, performance on strong lighting condition is still a problem, since higher contrasts in light intensities involve larger voltages drops on bitline which directly leads to a longer settling time.

What's more, as size of pixel gets smaller and with higher conversion gains utilized, the FD capacitance may get so small that the TX feed-through may easily go beyond the range of the analog-to-digital converter (ADC) input voltage.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1:
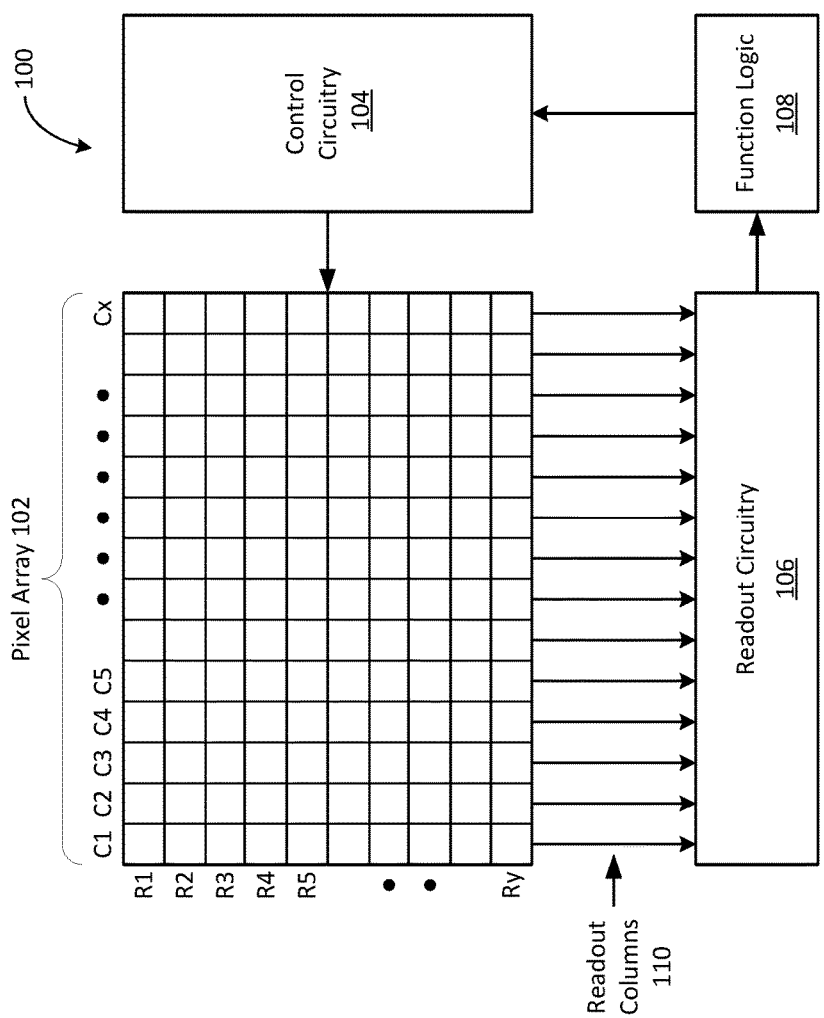
FIG. 1 illustrates one example of an imaging system in accordance with an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Embodiments of an apparatus and method for a fast settling pixel output line in an imaging sensor are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise.

FIG. 1 illustrates one example of an imaging system 100 in accordance with an embodiment of the present disclosure. Imaging system 100 includes pixel array 102, control circuitry 104, readout circuitry 106, and function logic 108. In one example, pixel array 102 is a two-dimensional (2D) array of photodiodes, or image sensor pixels (e.g., pixels P1, P2 . . . , Pn). As illustrated, photodiodes are arranged into rows (e.g., rows R1 to Ry) and columns (e.g., column C1 to Cx) to acquire image data of a person, place, object, etc., which can then be used to render a 2D image of the person, place, object, etc. However, photodiodes do not have to be arranged into rows and columns and may take other configurations.

In one example, after each image sensor photodiode/pixel in pixel array 102 has acquired its image charge through photo-generation of the image charge, corresponding image data is readout by readout circuitry 106 and then transferred to function logic 108. Readout circuitry 106 may be coupled to readout image data from the plurality of photodiodes in pixel array 102. In various examples, readout circuitry 106 may include amplification circuitry, analog-to-digital (ADC) conversion circuitry, or otherwise. In one example, readout circuitry 106 may readout a row of image data at a time along readout column lines 110 (illustrated) or may readout the image data using a variety of other techniques (not illustrated), such as a serial readout or a full parallel readout of all pixels simultaneously. Function logic 108 may store the image data or even manipulate the image data by applying post image effects (e.g., crop, rotate, remove red eye, adjust brightness, adjust contrast, or otherwise).

In some embodiments, function logic 108 may require certain imaging conditions to be met and may therefore instruct the control circuitry 104 to manipulate certain parameters in pixel array 102 to achieve better qualities or special effects.

Figure 2:
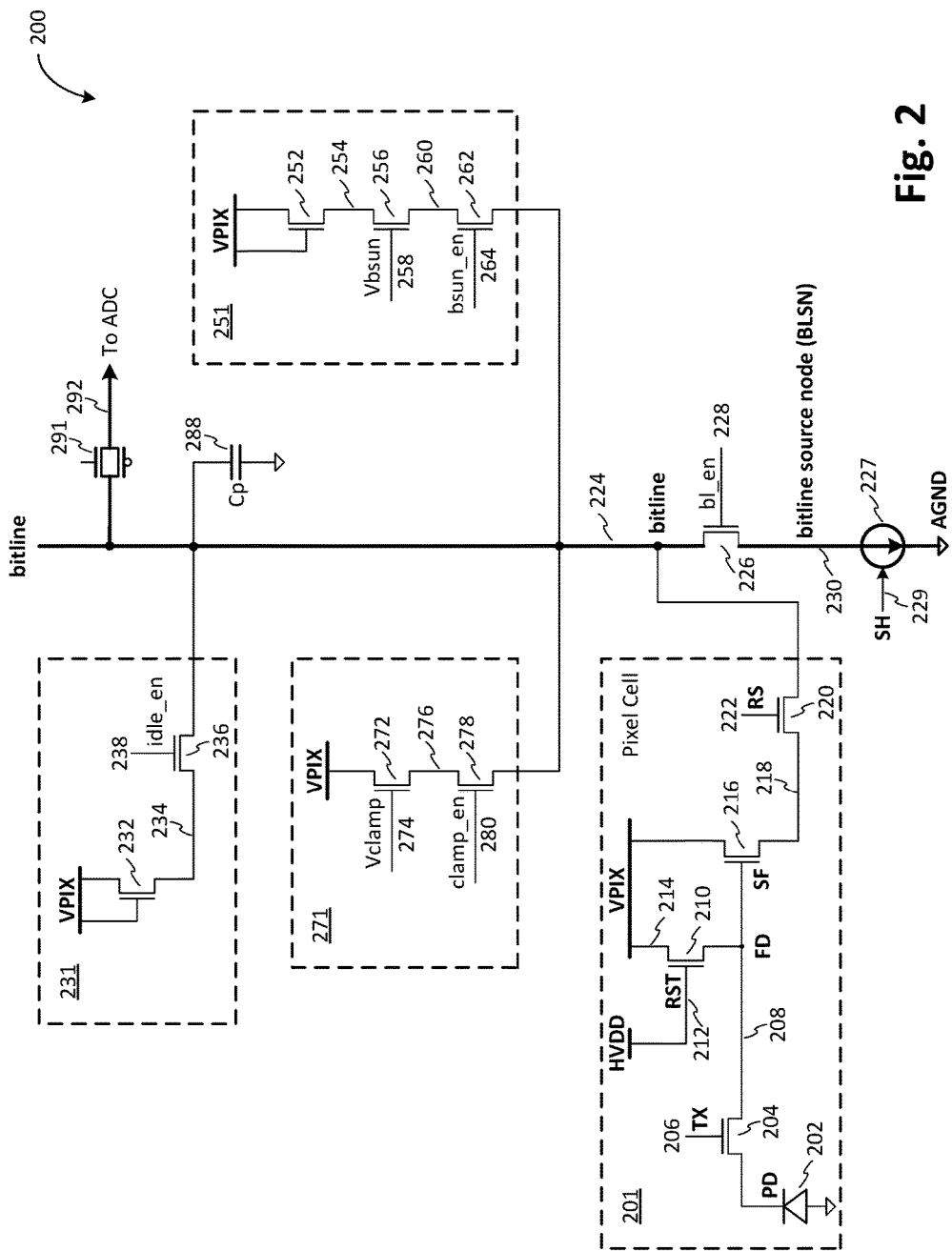
FIG. 2 is an example schematic of a block diagram of a pixel cell and pixel output circuit in an imaging sensor that is capable of fast settling in its bitline in accordance with an embodiment of the present disclosure.

FIG. 2 is one example of block diagram of a pixel cell and pixel output circuit in an imaging sensor that is capable of fast settling on its output line, bitline 224, in accordance with an embodiment of the present disclosure. The illustrated embodiment of image sensor system 200 may comprise a detecting photodiode (PD) 202 in a typical 4 transistor (4T) pixel cell 201, where the 4T portion may include a transfer (TX) transistor 204, a reset (RST) transistor 210, a source follower (SF) transistor 216, and a row select (RS) transistor 220. The RS transistor 220 is connected between the source terminal of the SF transistor 216 and the bitline 224, the drain terminal of the SF transistor 216 is connected to a pixel voltage (VPIX) directly, as shown in FIG. 2. The VPIX may be connected to a power supply voltage AVDD, or may be connected to a regulated voltage supply, where the regulated voltage supply is regulated based on the power supply from the AVDD. The node where the drain of the TX transistor 204, the source of the RST transistor 210, and the gate of the SF transistor 216 meet is a floating diffusion (FD) 208. A reset (RST) gate voltage 212 and a RS gate voltage 222 which are under the control of the control circuitry 104 (see FIG. 1) enable conductions of the RST transistor 210 and the RS transistor 220, respectively.

The TX transistor 204 is enabled by a transfer (TX) gate voltage 206. The TX transistor 204 can be switched on when a high connect voltage is asserted to the TX gate voltage 206, under which, in one embodiment, the photodiode (PD) 202 is connected to the TX receiving terminal 207 of the TX transistor 204 directly, the photo-generated signal charges accumulated at the PD 202 can be transferred to the FD 208 through the TX transistor 204. In another embodiment, the stored charges presented at the TX receiving terminal of the TX transistor 204 which are transferred by a transfer storage (TS) transistor from the PD 202 may be transferred to the FD 208 through the TX transistor 204. The TX transistor 204 can be switched off when a low enough disconnect voltage is asserted to the TX gate voltage 206.

The amplified image signal from the source terminal of the SF transistor 216 is delivered to the bitline 224 when the RS transistor 220 is switched on when the RS gate voltage 222 is set to high. The analog image signal on the bitline 224 is eventually presented to an input terminal 292 of an ADC. In one embodiment, such an ADC is one of the pluralities of ADCs coupled to each bitlines, or readout columns 110 as shown in FIG. 1, when a corresponding transmission gate 291 is enabled.

A bitline enable transistor 226 connects between the bitline 224 and a bitline source node (BLSN) 230. When a bitline enable voltage, bl_en 228, is set to high, the bitline enable transistor 226 is switched on, and the bitline 224 is connected to the BLSN 230.

A current source (CS) generator 227 is coupled between the BLSN 230 and an analog ground (AGND). The BLSN 230 may be sunk by the CS generator 227.

Three voltage generators are connected to the bitline 224 to source current to it. They are an idle voltage (IV) generator 231, a blacksun voltage (BV) generator 251, and clamp voltage (CV) generator 271.

The idle voltage (IV) generator 231 serves as a current source to the bitline 224. This IV generator 231 is supplemental (to the blacksun voltage generator 251) in maintaining an idle potential to the bitline 224 regardless whether the bitline 224 is floated by the bitline enable transistor 226 or not. This IV generator 231 sources additional current to the floating bitline 224 which has a load represented mostly by a parasitic capacitor Cp 288 when horizontal blanking (H-blanking) takes place. For each row of the pixel array 102 of the image sensor, H-blanking clears each readout columns 110 of the entire concurrent row, prior to a new readout cycle. In one embodiment, when the RS transistor 220 is switched off, the idle potential is maintained at a closest value to that of the SF source terminal 218 when the gate of the SF 216 is set to a reset FD voltage (VPIX) by the RST transistor 210. The VPIX is a voltage used to reset the floating diffusion controlled by the RST gate potential HVDD. HVDD is controlled by the control circuitry 104. When the RS transistor 220 is switched on again, as may be the situation in one embodiment mentioned earlier, potential at the bitline 224 has been pre-charged to a similar level of the SF source terminal 218, therefore the settling time that the bitline 224 joins the SF 216 is much shortened. That is because when the bitline 224 is reconnected to the SF 216 in such an embodiment, the voltage difference between the bitline 224 and the SF output 218 is greatly reduced. The IV generator 231 comprises an idle supply transistor 232 that receives VPIX and provides an idle supply voltage 234. When an idle enable transistor 236 is switched on by an idle enable signal 238, the idle supply voltage 234 drives the bitline 224. The idle enable signal 238 is controlled by the control circuitry 104.

The blacksun voltage (BV) generator 251 comprises a blacksun supply transistor 252, a blacksun transistor 256 and a blacksun enable transistor 262. The blacksun supply transistor 252 provide a blacksun supply voltage 254 which is guaranteed to be lower than VPIX because the voltage drop between a drain terminal and a source terminal of the blacksun supply transistor 252. The blacksun voltage transistor 256 receives the blacksun supply voltage 254 and provides an adjustable blacksun voltage 260 under the control of a blacksun control voltage 258. A blacksun enable transistor 262, under the control of a blacksun enable voltage 264, pulls the bitline 224 up to the adjustable blacksun voltage 260.

The clamp voltage (CV) generator 271 comprises a clamp voltage transistor 272 and a clamp enable transistor 278. The clamp voltage transistor 272 receives the VPIX and provides an adjustable clamp voltage 276 under the control of a clamp control voltage 274. The clamp enable transistor 278, under the control of a clamp enable voltage 280, pulls the bitline 224 up to the adjustable clamp voltage 276.

The adjustable blacksun voltage 260 provides a much higher potential than the adjustable clamp voltage 276 does on the BLSN 230. If VPIX, the highest potential of the pixel circuit, represents the darkest image boundary which the ADC sees as an upper limit of its converting range, and any normal background signals fall slightly below VPIX, then, the adjustable blacksun voltage 260 is set to be lower than the lowest voltage of those background signals. The blacksun voltage provided to the bitline 224 by the BV generator 251 still represents a dark image, and only slightly less dark than those background signals. The purpose of the BV generator 251 is explained in the next paragraph.

The blacksun voltage is used to avoid the so-called sun eclipse effect (or blacksun effect). That is, when the image sensor is facing the sunlight directly, the supposedly "dark" background at the FD 208 is filled with a lot of electrons either generated directly on the FD (since the FD itself is a photo sensitive substance) or bloomed unstoppably from its surrounding silicone. As a result, this supposedly dark background noise signal is converted and saved as an actual bright signal. After the real bright (plus noise) signal is saved at a later time, based on the correlated double sampling (CDS) method, after the ADC, a subtraction of the two saved almost equally "bright" signals induces to a near "zero" final signal, which is equivalent to a black image at the spot where the bright sun should be presented. As can be seen, if left as is, the bright sun becomes a black sun as a result of the subtraction mentioned above—therefore it comes the named term "the black sun". To overcome the black sun effect, the blacksun voltage forces a black level when known background signal (black or near black) is taken during the CDS process. As a result, the sun in the image will no longer be black.

The blacksun control voltage 258 is controlled by the control circuitry 104 based on the feedback on where the level of normal background signals are presented. Once the lowest equivalent voltage (among many normal background signals) is determined by the function logic 108, that value is fed to the control circuitry 104. And then, an updated blacksun control voltage 258 is fed to the BV generator 251 to ensure that the background signals will be "black" enough for the CDS process. Potential wise, the blacksun voltage sets a relative high voltage limit not far below the value of VPIX.

The adjustable clamp voltage 276, in contrast to the adjustable blacksun voltage 260, sets a lowest limit voltage. It represents the brightest image boundary which the ADC sees at the lower end of its converting range.

The control circuit 104 provides all four control signals: the clamp control voltage 258, the clamp enable voltage 264, the blacksun control voltage 272, and the blacksun enable voltage 278, to control the BV generator 251 and the CV generator 271.

Figure 3:
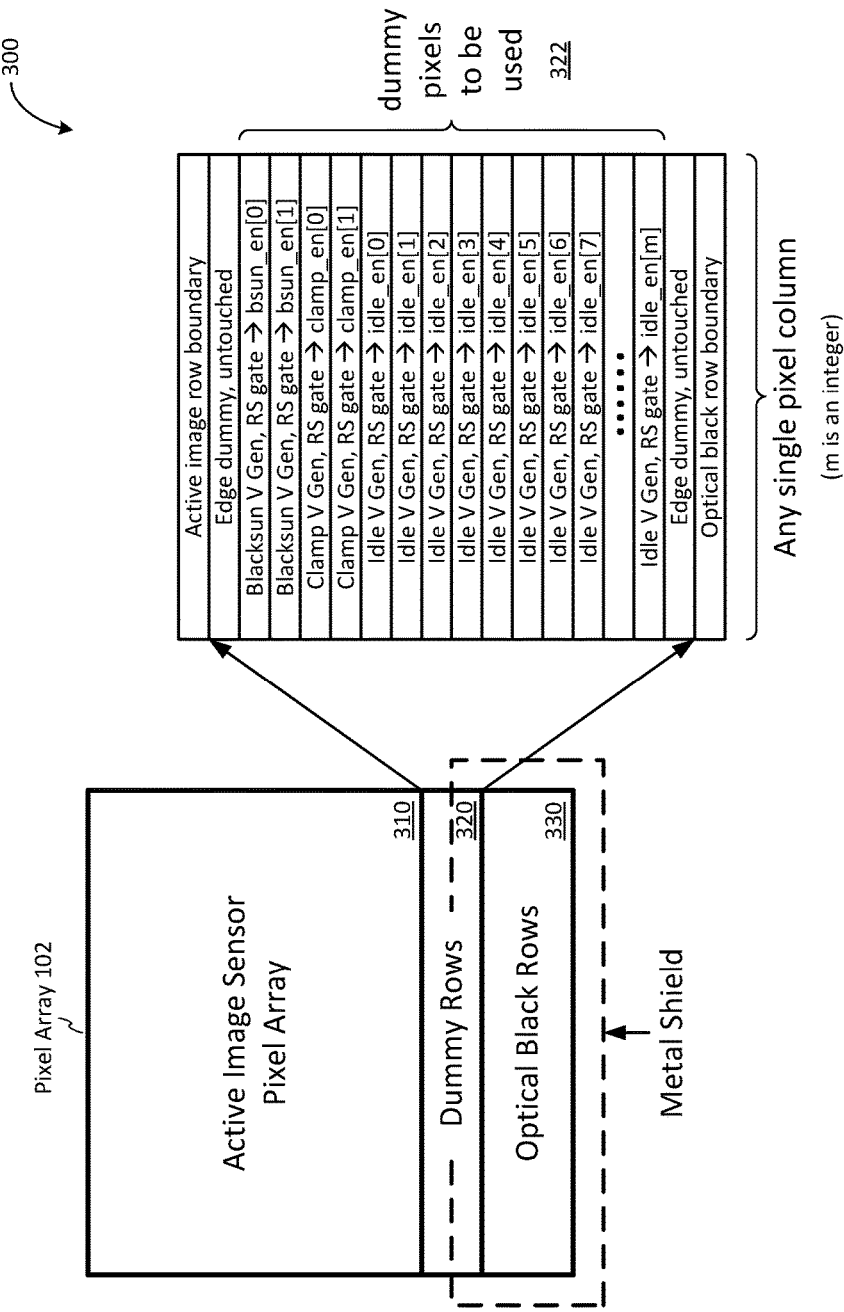
FIG. 3 is an example schematic of a block diagram of a pixel array and dummy pixels in an imaging sensor that is used for fast settling in its bitline in accordance with an embodiment of the present disclosure.

FIG. 3 is an illustrative diagram of the pixel array 102 that is normally made in reality. The pixel array 102 not only consists of active image sensor array 310, but also many optical black rows 330. Between the active image sensor array 310 and the optical black rows 330 lay a region made of many so-called dummy rows 320, to serve as transition region. Each dummy row and each optical black row has P1, P2, . . . , Px pixel cells, the very same cells like the P1, P2, . . . , Px pixel cells found in each row of the active image sensor array 310. Simply put, all pixel cells in the pixel array 102 are exactly the same cell regardless of which region 310, 320, or 330, a cell is actually located in.

The optical black rows 330 serves to calibrate the true black noise level of the active image sensor array 310. In order to maintain true blackness of the optical black rows 330, the optical black rows 330 are covered with metal shield (dashed bracket in FIG. 3)—a layer made of real metal during the manufacture when all photodiodes are made in pixel array 102. When made out of proper thickness and proper area overhang like illustrated with the dash-lined area which is larger than the optical black row region 330 in FIG. 3, the metal shield layer does block light from reaching all the optical black rows 330. As a consequence, dummy rows 320 are implemented and physically inserted between region 310 and region 330 as transition region 320. Due to the identity of all pixel cells in pixel array 102, P1, P2, ..., Px dummy pixels in each dummy rows in an imaging sensor, each dummy pixel is modified and used for fast settling of the bitline 224 in accordance with an embodiment of the present disclosure.

Figure 4:
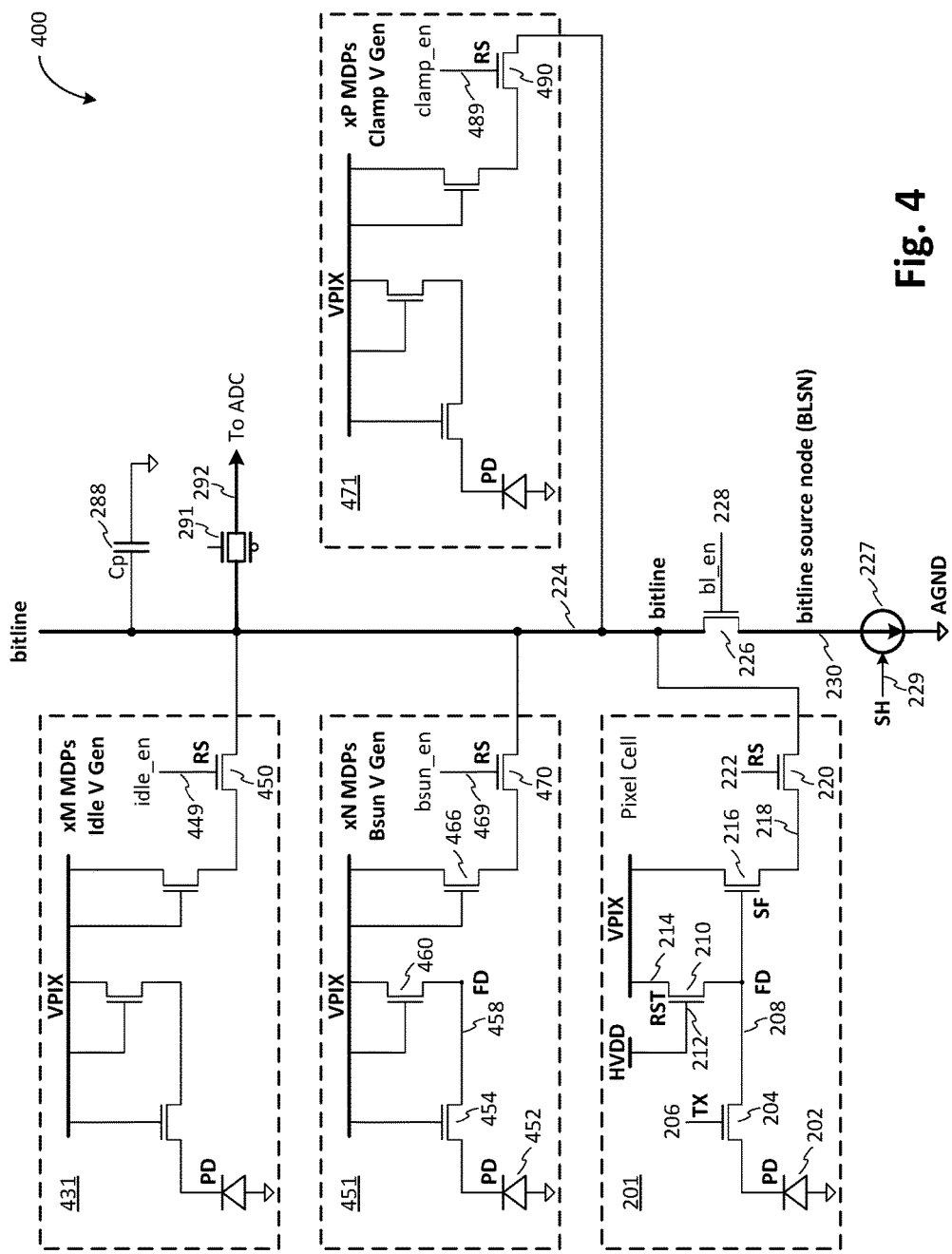
FIG. 4 is an example schematic of a block diagram of a pixel cell and pixel output circuit in an imaging sensor that is capable of fast settling in its bitline by using modified dummy pixel cells for clamping in accordance with an embodiment of the present disclosure.

In principal, each dummy pixel is modified to form a modified dummy pixel (MDP). Each MDP may serve as a voltage generator of any kind (IV/BV/CV). A comparison between any given dummy pixels as represented the same as a normal Pixel Cell 201 and a MDP as depicted in 451 of FIG. 4 illustrated how this works. In FIG. 4, each dummy pixel the same as 201 may be split into two sections. A first section consists of the PD 202/452, the TX transistor 204/454, the FD 208/458, and the RST transistor 210/460. A second section consists of the SF transistor 216/466 and the RS transistor 220/470. A physical modification to reroute the SF gate from the FD 208 in a normal pixel cell 201 to the SF drain in any dummy pixel may convert the second section of the dummy pixel 451 to a voltage generator by itself. That is as simple and easy as illustrated in FIG. 4. Also as simple and easy, in the modification to the first section of the dummy pixel, the TX gate and the RST gate are both tied to a high voltage VPIX. As a result, the modifications to both the first and the second sections of a dummy pixel convert a dummy pixel to a MDP, where the old RS gate terminal in a dummy pixel serves as a generator enable (gen_en) to the voltage generator in a MDP.

VPIX and the RST gate control voltage HVDD in a pixel cell may have the same or different potential. Either way, with MDP, light generated charges from the PD 452 are quenched through the TX transistor 454, the FD 458, and the RST transistor 460 to the power supply. The FD 458, as being photosensitive device itself, also generates photo induced electrons that are quenched through the RST transistor 460 during the same time the PD charges are quenched. Charges generated from either the PD 452 or the FD 458 may bloom into the neighbor pixels and cause unwanted results. These unwelcomed charges must be suppressed actively as executed in MDP before any damages take place.

FIG. 4 shows that each of the three voltage generators, the IV generator 431, the BV generator 451, and the CV generator 471, may now be replaced with one or a plurality of the MDPs. The use of additional MDP(s) gives each voltage generator additional power in sourcing current. As illustrated in FIG. 4, the IV generator 431 may consist of M MDPs; the blacksun votage generator 451 may consist of N MDPs; and the CV generator 471 may consist of P MDPs, where M, N, and P are each an integer of a value equal or larger than 1.

The use of multiple MDPs for each of the three voltage generators is made possible by the fact of multiple dummy rows existed in region 320 of FIG. 3. For each column readout, as illustrated in FIG. 3 from top to bottom, as in one embodiment, the BV generator 451 may employ two MDPs which are enabled by bsun_en[0] and bsun_en[1] (or bsun_en[1:0] in design language). The CV generator 471 may employ another two MDPs which are enabled by clamp_en[1:0]. The IV generator 431 may employ all the remaining MDPs available in the dummy rows which are enabled by idle_en[m:0], where m is an integer equal or larger than 2. The reason of the IV generator 431 having more MDPs than the BV and CV generators is reserved for later discussion in FIG. 5 section. For now, one may as least see that the two edge dummy rows: one adjacent on top to the boundary of active image sensor pixel array 310; and one on the bottom to the boundary of optical black rows, are not used. The top edge dummy row is left untouched to serve as a buffer zone to minimize interference between the active image sensors and the dummy rows that are used to implement the IV/BV/CV generators. The bottom edge dummy row is left untouched to serve as a buffer zone to minimize interference between the optical black rows and the dummy rows that are used to implement the IV/BV/CV generators.

Figure 5:
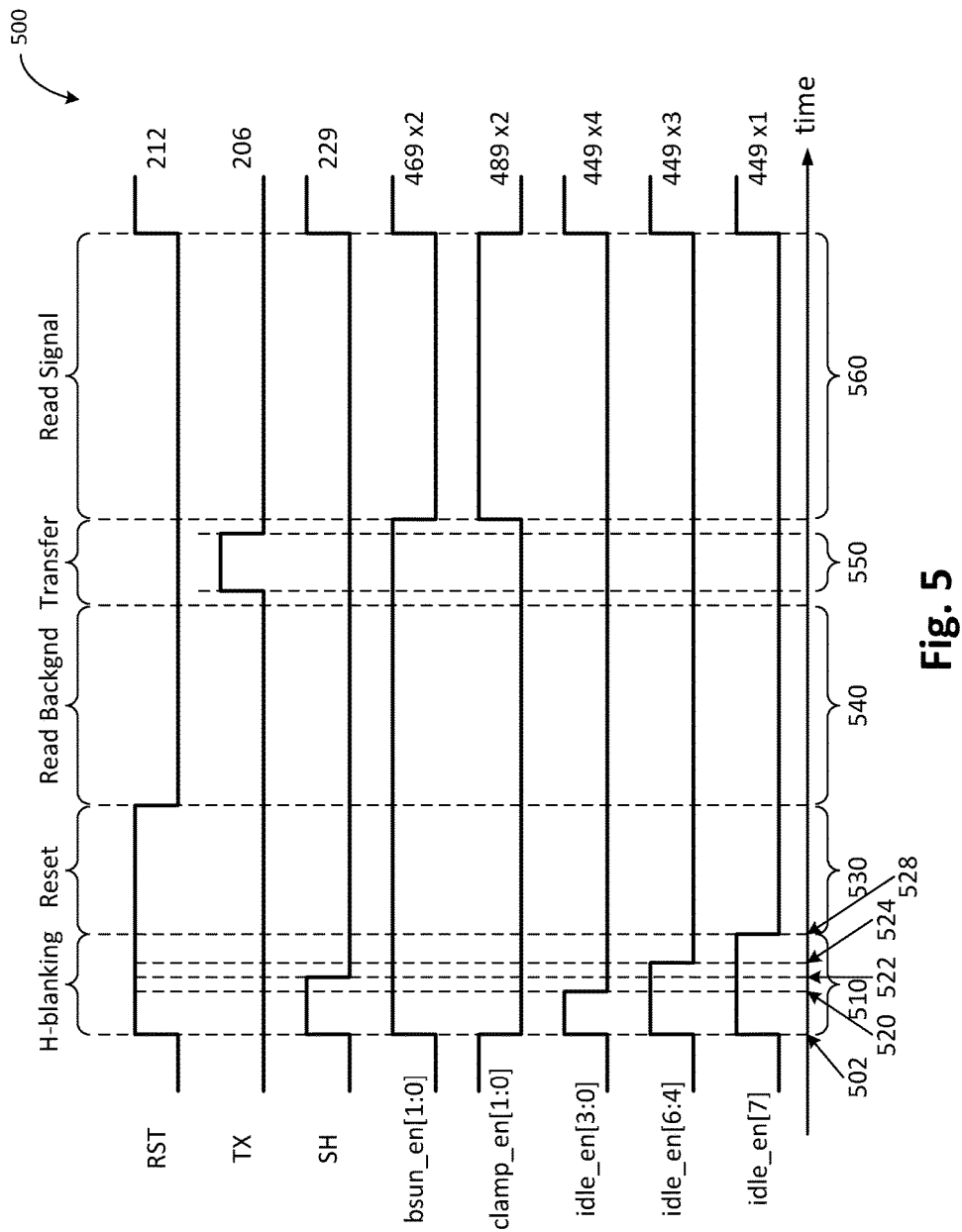
FIG. 5 is an example waveform in association with the operation of the photodiode in an imaging sensor in dealing with bitline settling in accordance with an embodiment of the present disclosure.

FIG. 5 is an illustrative signal readout operation 500 of a pixel cell and its output circuit in an imaging sensor that is capable of fast settling of its output line, the bitline 224, in accordance with an embodiment of the present disclosure. To better understand FIG. 5 and the sequence it represents, a timing flowchart is provided in FIG. 6 to explain all major events that take place in FIG. 5 in conjunction with FIG. 4.

Figure 6:
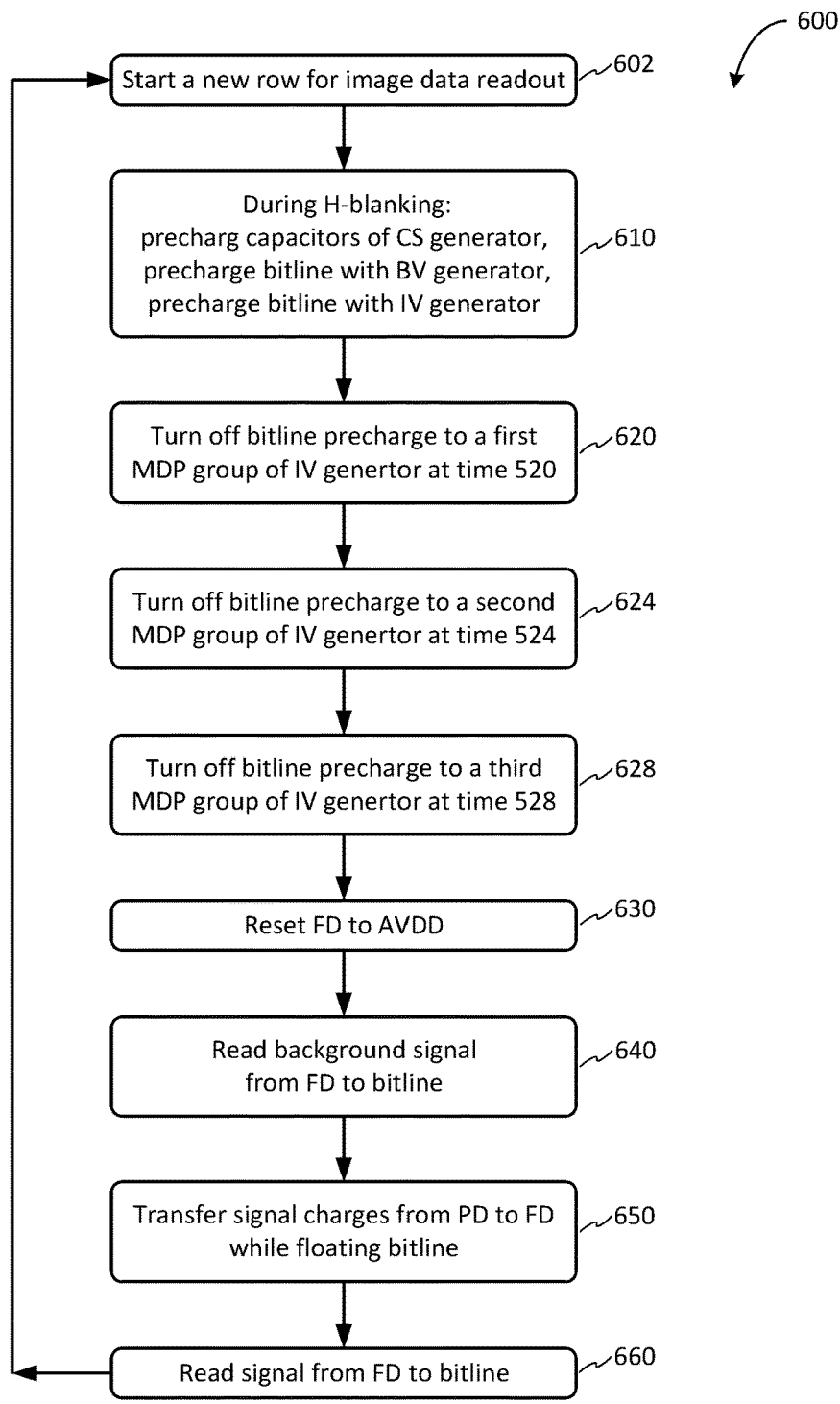
FIG. 6 is an illustrative flow chart in associate with the events of FIG. 5 in accordance with an embodiment of the present disclosure.

FIG. 6 is an illustrative flow chart 600 in accordance with an embodiment of the present disclosure. The flow chart 600 may illustrate a complete cycle of row readout and demonstrates how fast settling on the bitline 224 may be achieved in a typical data readout cycle using the disclosed circuitry 400.

The flow chart 600 begins with process block 602 which is corresponding to time 502 in FIG. 5 and followed by process block 610. Block 602 marks the beginning of a readout cycle where a new row of a plurality of pixel cells is being read out by the readout circuitry 106. Process block 610 is correlated to the time region 510 shown in FIG. 5. Process block 610 coincides with the Horizontal blanking (H-blanking) for each row of the pixel array 102. H-blanking clears each readout columns 110 of the entire concurrent row, prior to a new readout cycle of the row. Circuit-condition-wise, during block 610, the RST transistor 210 is switched on by the RST gate voltage 212 to reset the FD 208 to the HVDD. Meanwhile, in one embodiment, both the RS transistor 220 and the bitline enable transistor 226 may be switched off by the RS gate voltage 222 and the bitline enable (bl_en) voltage 228 simultaneously. As a consequence, this switch-offs may isolate the bitline 224 from both the pixel cell readout circuit 201 and the current source coupled between the BLSN and the AGND. In another embodiment, only the RS transistor 220 may be switched off by RS gate voltage 222 which may isolate the bitline 224 from the pixel cell readout circuit 201.

Three major pre-charging activities take effect simultaneously during the process block 610 which coincides with the subsequent H-blanking. Firstly, the current source (CS) generator 227 that is coupled between the BLSN 230 and the AGND is pre-charged and therefore enabled by the sample and hold (SH) voltage pulse 229. The SH pulse 229 is on from time 502 to time 522 as seen in FIG. 5. Beyond the block 610 after the SH pulse is removed, the sinking current provided by the CS generator 227 before the appearance of the next SH pulse is properly maintained (held with slow voltage decay) by the internal holding capacitor or capacitors. The capacitor-held voltage is used to control bias that sets the sinking current of the CS generator 227.

Secondly, the clamp voltage (CV) generator 471 is disabled by setting the clamp enable voltage, clamp_en 489, to low. And the blacksun voltage (BV) generator 451 is enabled by setting the blacksun enable voltage, bsun_en 469, to high. The bitline 224 is charged by the BV generator 451.

Thirdly, the idle voltage (IV) generator 431 is enabled by setting the idle enable voltage, idle_en 449, to high. The isolated (from the pixel cell 201) bitline 224 is charged (or sourced) by the IV generator 431 (in additional to the BV generator 451) through the bitline parasitic capacitor Cp 288 to the idle potential that matches closely to the high voltage value appeared on the SF source potential 218, since the SF gate, or the FD 208, is set to the HVDD by the RST transistor 210 during this same period.

As illustrated in FIG. 3 and FIG. 5, for the readout of each column pixel starts at time 502, in one embodiment, there are two pixels from two dummy rows applied to the BV generator 451. That means that the driving capability of the BV generator 451 is doubled by employ two MDPs (from the two dummy rows) which are enabled by bsun_en[1:0] (refer to 322 of FIG. 3) in comparing to the use of a single MDP. That may not be enough in driving capability, however. To further enhance the driving capability during the H-blanking within block 510, as can be seen from FIG. 5, eight more MDPs are employed by the IV generator 431 to assist which are enabled by idle_en[7:0], as in the embodiment demonstrated as "dummy pixels to be used" 322 of FIG. 3.

The IV generator 431 may employ all the remaining MDPs available in the dummy rows which are enabled by idle_en[m:0]. This is because more driving capacity from the IV generator 431 is needed for H-blanking than from the BV and CV generators, in general, to pull the bitline 224 voltage up to its intended high reset level by using as full a current capacity as possible. This extra effort from the IV generator 431 helps to shorten the reset settling time of each row, therefore shortening the H-blanking time. As a direct consequence, the readout time for each row is reduced, as well as the overall frame time. Swapping the charging duty from the CV generator 471 to the BV generator 451 at time 502 helps to maintain a stable consumption of the supply power at AVDD, because the bitline 224, as a load circuit, is continuously charged by either the CV generator 471 or the BV generator 251.

Another important character seen from the behavior of the idle_en[7:0] is the gradual turn-off of the IV power indicated by the number of active MDPs in the IV generator 431. To begin with, all 8 MDPs are enabled at the same time when idle_en[7:0] are set to high at time 502. Process block 620 takes place at time 520, where 4/8 (50%) of the driving power is removed by disabling 4 out of the 8 MDPs when idle_en [3:0] are set to low. Process block 624 takes place at time 524, where another 3/8 (37.5%) of the driving power is lifted by disabling 3 more MDPs when idle_en[6:4] are set to low. Now, only one idle row is effective near the end of the H-blanking. Process block 628 takes place at time 528, where the remaining 1/8 (12.5%) of the driving power to the fast settling of the bitline 224 is terminated by disabling the last active MDP of the IV generator 431 when idle_en[7] is set to low. That's the same time the H-blanking ends.

The gradual idle clamp control has benefit of achieving better voltage matching by activating a single MDP at a time since the finer tuning of single MDP out of a plurality of MDPs offers a better resolution. The rising time and falling time of each bit of the idle_en[m:0] are controlled by the control circuitry 104. The many MDPs available from the dummy rows makes it possible to build a much stronger current source (to the IV generator 431 by putting more identical current sources from each MDP in parallel) to pull up the bitline 224 and settle it faster. The overall frame rate (or readout time) is reduced as results of the fast settling of the bitline 224 during RST (FIG. 5) which is a direct result of the time reduction in H-blanking.

The process block 628 may be followed by process block 630. Process block 630 is correlated to the time region 530 shown in FIG. 5. During block 630, the RST gate voltage 212 remains high to keep the RST transistor 210 on. The FD 208 is continuously reset to the HVDD. Block 630 allows enough time for the bitline 224 to stabilize after the bitline 224 has been reconnected to the SF transistor 216 when the RS transistor 220 is switched from off to on, in one embodiment, as well as been reconnected to the BLSN 230 when the bitline enable transistor 226 is switched from off to on, in another embodiment.

The process block 630 may be followed by process block 640. Process block 640 is correlated to the time region 540 shown in FIG. 5. During block 640, the RST transistor 210 is turned off. A background signal on the FD 208 is amplified by the SF transistor 216 and then an amplified background signal is provided to the bitline 224 through the RS transistor 220. During this period, only the BV generator 451, among all three voltage generators, is enabled by the blacksun enable voltage bsun_en[1:0]. The blacksun voltage drives both the bitline 224 and the BLSN 230 at the same time if the bitline enable transistor 226 is closed by the bitline enable bl_en 228. The blacksun voltage provided to the bitline 224 by the BV generator 451 may provide a potential generally set on the high side which is only slightly lower than the normal background signals. If the VPIX represents the darkest image signal, then, the not-too-much lower blacksun voltage sets a dark enough image signal if not quite the darkest. Appearing to the ADC, if the VPIX represents the lowest value of the ADC outputs, then the blacksun voltage ensures a very low value at the ADC output that is not-too-much higher than the lowest value that the ADC converts within its range.

The process block 640 may be followed by process block 650. Process block 650 is correlated to the time region 550 shown in FIG. 5. During block 650, photo-generated signal charges accumulated on the PD 202 are transferred to the FD 208 when the transfer transistor 204 is switched on by the TX gate voltage 206. The RS transistor 220, in one embodiment, the RS transistor 220 and the bitline enable transistor 226, in another embodiment, are switched off before the charge transfer and switched back on after the charge transfer. This is to ensure no overlaps between the high level of TX voltage 206 and the high levels of the RS gate voltage 222 and the bitline enable signal bl_en 228. The idle enable signal idle_en[m:0] remain off when the TX transistor 204 is toggled on and off during this current process block 650 in this disclosure.

The process block 650 may be followed by process block 660. Process block 660 is correlated to the time region 560 shown in FIG. 5. During block 660, in general, the image charges transferred from the PD 202 to the FD 208 is converted to image voltage signal by the SF transistor 216 and then provided to the bitline 224 through the RS transistor 220. To be exact, right after the pulse on the TX gate 206 ends in block 650, the RS transistor 220 is reconnected by setting the RS gate voltage 222 to high to allow image signal voltage on the SF source terminal to drive the bitline 224, in one embodiment, and the bitline enable transistor 226 is reconnected by setting the bitline enable bl_en 228 to high to allow the BLSN 230 reconnecting to the bitline 224. The bitline 224 is not only sourced by the IV/BV/CV generators, but also sunk by the CS generator 227.

During block 660, as acting voltage generator to source the bitline 224, the function of BV generator 451 is taken over by the CV generator 471. This swap takes effect by setting the blacksun enable voltage bsun_en[1:0] 469 to low and the clamp enable voltage clamp_en[1:0] 489 to high simultaneously as seen in FIG. 5. The clamp voltage provided to the bitline 224 by the CV generator 471 is set much lower than the blacksun voltage provided to the bitline 224 by the BV generator 251. At the beginning of block 660, the voltage on the bitline 224 starts to move downward from a higher blacksun voltage to a much lower clamp voltage.

The clamp voltage provided to the bitline 224 by the CV generator 471 may provide a slightly higher potential than the level that represents the absolute brightest light. The clamp voltage sets a limit on the lowest boundary which is equivalent to the brightest signal that appears to the ADC. Although it is not the brightest but close enough so that the ADC may accept it as its input and converts it to serve as its highest value at the ADC output without overflow the ADC. The clamp voltage ensures a lower voltage limit that the ADC is able to handle. The CV generator 471 also serves to minimize the variation of the power consumption once it takes over the function of the BV generator 451 and continuously maintains stability of the total AVDD current.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A fast settling output line circuit, comprising:
   a pixel cell comprising:
      a photodiode (PD) adapted to accumulate image charges in response to incident light;
      a transfer (TX) transistor coupled between the PD and a floating diffusion (FD) to transfer the image charges from the PD to the floating diffusion (FD), wherein a transfer (TX) gate voltage controls the transmission of the image charges from the PD to the FD;
      a reset (RST) transistor coupled to supply a reset FD voltage (VPIX) to the FD, wherein a reset (RST) gate voltage (HVDD) controls the RST transistor;
   a source follower (SF) transistor coupled to receive voltage of the FD from a SF gate terminal and provide an amplified signal to a SF source terminal;
   a row select (RS) transistor coupled between the SF transistor and a bitline, wherein a row select (RS) gate voltage controls the RS transistor, and wherein the RS transistor passes the amplified signal from the SF source terminal to the bitline; and
   M first voltage generators, wherein each first voltage generator is configured to receive the VPIX and provide a first voltage to the bitline under the control of a first voltage enable, wherein M is an integer equal or larger than one, and wherein the first voltage is one of an idle voltage provided by an idle voltage generator, a blacksun voltage provided by a blacksun voltage generator, and a clamp voltage provided by a clamp voltage generator, wherein the first voltage generator comprises a modified dummy pixel (MDP), and wherein the MDP is the same cell as the pixel cell except that
      (i) the TX gate is coupled to receive VPIX instead of the TX gate voltage, (ii) the RST gate is coupled to receive VPIX instead of the RST gate voltage (HVDD), and (iii) the SF gate is coupled to receive VPIX instead of the FD; and
   a bitline enable transistor coupled between a bitline and a bitline source node (BLSN), wherein a bitline enable voltage controls the bitline enable transistor.

2. The fast settling output line circuit of claim 1, further comprising N second voltage generators, wherein each second voltage generator is configured to receive the VPIX and provide a second voltage to the bitline under the control of a second voltage enable, wherein each second voltage generator comprises the MDP, and wherein N is an integer equal or larger than one, and wherein the second voltage generator is one of the idle voltage generator the blacksun voltage generator, and the clamp voltage generator.

3. The fast settling output line circuit of claim 1, further comprising P third voltage generators, wherein each third voltage generator is configured to receive the VPIX and provide a third voltage to the bitline under the control of a third voltage enable, wherein each third voltage generator comprises the MDP, and wherein P is an integer equal or larger than one, and wherein the third voltage generator is one of the idle voltage generator, the blacksun voltage generator, and the clamp voltage generator.

4. The fast settling output line circuit of claim 1, wherein the clamp voltage is lower than the blacksun voltage.

5. The fast settling output line circuit of claim 1, further comprising a current source (CS) generator coupled between the BLSN and a ground (AGND), wherein the CS generator sinks current from the BLSN under control of a sample and hold (SH) signal, and wherein the sinking current of the CS generator during the period when the SH signal is turned off is maintained by a holding capacitor of the CS generator.

6. The fast settling output line circuit of claim 1, wherein the VPIX connects to a regulated voltage supply, wherein the regulated voltage supply is regulated based on a supply power voltage AVDD.

7. The fast settling output line circuit of claim 1, wherein the VPIX and the HVDD have the same value.

8. The fast settling output line circuit of claim 1, wherein the VPIX and the HVDD have different values.

9. The fast settling output line circuit of claim 1, further comprising a transmission gate passing the amplified signal from the bitline to an ADC input.

10. A method of fast settling an output line circuit, comprising:
    resetting a floating diffusion (FD) to a reset FD voltage (VPIX) by setting a reset (RST) gate voltage to a high voltage (HVDD) to switch on a reset (RST) transistor when a row select (RS) transistor is switched off by setting a RS gate to low;
    precharging a bitline to a blacksun voltage provided by turning on each of a plurality of blacksun enable transistors by setting each of blacksun enable voltage bits to high, and turning off each of a plurality of clamp enable transistors by setting each clamp enable voltage bits to low, when the RST transistor is switched on and a row select (RS) transistor is switched off;
    precharging a bitline to a SF source reset voltage by turning on each of a plurality of idle enable transistors by setting idle enable voltage bits to high when the RST transistor is switched on and the row select (RS) transistor is switched off;
    discontinuing the precharging from idle voltage (IV) generators to the bitline by setting some of the idle enable voltage bits to low to turn off respective idle enable transistors at different time, wherein the turning off of the last idle enable transistor coincides with the switching on of the RS transistor by setting the RS gate voltage to high;

connecting the SF source terminal to the bitline by setting a RS gate voltage to high to switch on the RS transistor;

disconnecting the FD from a pixel voltage (VPIX) by setting the RST gate voltage to low to switch off the RST transistor; and reading a background signal from the FD, wherein a SF transistor receives the background signal at a SF gate terminal and provides an amplified background signal at a SF source terminal, wherein the RS transistor passes the amplified background signal from the SF source terminal to the bitline through the switched-on RS transistor, and wherein the amplified background signal from the bitline is passed on to an ADC input terminal.

11. The method of claim 10 further comprising:

precharging biasing capacitors in a current source (CS) generator by setting a sample and hold (SH) voltage to high to activate the current source generator when the RST transistor is switched on and a row select (RS) transistor is switched off; and discontinuing the precharge to the biasing capacitors in the CS generator by setting the SH voltage to low to allow the current source generator to maintain an enabled sink current through an internal holding capacitor when the RST transistor is still switched on.

12. The method of claim 10 further comprising transferring image charges accumulated from the PD to the FD by switching a transfer (TX) transistor on and off with a toggle of a TX gate voltage.

13. The method of claim 12, wherein after the TX transistor is switched off by setting the TX gate voltage to low, the blacksun enable transistors are turned off by setting the blacksun enable voltage bits to low, and the clamp enable transistors are turned on by setting the clamp enable voltage bits to high.

14. The method of claim 13, wherein the SF transistor converts the image charges from the FD to an amplified image signal to the bitline through the switched-on RS transistor, and wherein the amplified image signal from the bitline is passed on to an ADC input terminal.

15. The method of claim 14, wherein a transmission gate passes the amplified image signal from the bitline to the ADC input terminal by enabling the transmission gate.

16. The method of claim 10, wherein the blacksun voltage is higher than a clamp voltage provided to the bitline by each clamp enable transistor.

17. The method of claim 10, wherein the SF source reset voltage is a voltage value of the SF source terminal when the FD is reset though the RST transistor to VPIX and when the RS transistor is switched off.

18. An imaging system with a fast settling output line circuit, comprising:

a pixel array of pixel cells, wherein each pixel cell includes:
 a photodiode (PD) adapted to accumulate image charges in response to incident light;
 a transfer (TX) transistor coupled between the PD and a floating diffusion (FD) to transfer the image charges from the PD to the floating diffusion (FD), wherein a transfer (TX) gate voltage controls the transmission of the image charges from the PD to the FD;
 a reset (RST) transistor coupled to supply a reset FD voltage (VPIX) to the FD, wherein a reset (RST) gate voltage (HVDD) controls the RST transistor; and
 a source follower (SF) transistor coupled to receive voltage of the FD from a SF gate terminal and provide an amplified signal to a SF source terminal;
 a row select (RS) transistor coupled between the SF transistor and a bitline, wherein a row select (RS) gate voltage controls the RS transistor, and wherein the RS transistor passes the amplified signal from the SF source terminal to the bitline; and M first voltage generators, wherein each first voltage generator is configured to receive the VPIX and provide a first voltage to the bitline under the control of a first voltage enable, wherein M is an integer equal or larger than one, and wherein the first voltage is one of an idle voltage provided by an idle voltage generator, a blacksun voltage provided by a blacksun voltage generator, and a clamp voltage provided by a clamp voltage generator, wherein the first voltage generator comprises a modified dummy pixel (MDP), and wherein
 the MDP is the same cell as the pixel cell except that (i) the TX gate is coupled to receive VPIX instead of the TX gate voltage, (ii) the RST gate is coupled to receive VPIX instead of the RST gate voltage (HVDD), and (iii) the SF gate is coupled to receive VPIX instead of the FD; and a bitline enable transistor coupled between a bitline and a bitline source node (BLSN), wherein a bitline enable voltage controls the bitline enable transistor;

a control circuitry coupled to the pixel array to control operation of the pixel array, wherein the control circuitry provides the TX gate voltage, the RST gate voltage (HVDD), the RS gate voltage, the bitline enable voltage, a sample and hold (SH) voltage, a clamp control voltage, a clamp enable voltage, a blacksun control voltage, a blacksun enable voltage, an idle enable voltage, MDP clamp enable voltage bits, MDP blacksun enable voltage bits, and MDP idle enable voltage bits to the pixel array;

a readout circuitry coupled to the pixel array through a plurality of readout columns to readout image data from the plurality of pixels; and a function logic coupled to receive image data from the readout circuitry to store the image data from each one of the plurality of pixel cells, wherein the function logic provides instructions to the control circuitry.

19. The fast settling imaging system of claim 18, further comprising N second voltage generators, wherein each second voltage generator is configured to receive the VPIX and provide a second voltage to the bitline under the control of a second voltage enable, wherein each second voltage generator comprises the MDP, and wherein N is an integer equal or larger than one, and wherein the second voltage generator is one of the idle voltage generator, the blacksun voltage generator, and the clamp voltage generator.

20. The fast settling imaging system of claim 18, further comprising P third voltage generators, wherein each third voltage generator is configured to receive the VPIX and provide a third voltage to the bitline under the control of a third voltage enable, wherein each third voltage generator comprises the MDP, and wherein P is an integer equal or larger than one, and wherein the third voltage generator is one of the idle voltage generator, the blacksun voltage generator, and the clamp voltage generator.

21. The fast settling imaging system of claim 18, wherein the clamp voltage is lower than the blacksun voltage.

22. The fast settling imaging system of claim 18, further comprising a current source (CS) generator coupled between the BLSN and a ground (AGND), wherein the CS generator sinks current from the BLSN under control of a sample and hold (SH) signal pulse, and wherein the sinking current of the CS generator during the period when the SH signal is turned off is maintained by a holding capacitor of the CS generator.

23. The fast settling imaging system of claim 18, wherein the VPIX connects to a regulated voltage supply, wherein the regulated voltage supply is regulated based on a supply power voltage AVDD.

24. The fast settling imaging system of claim 18, wherein the VPIX and the HVDD have the same value.

25. The fast settling imaging system of claim 18, wherein the VPIX and the HVDD have different values.

26. The fast settling imaging system of claim 18, further comprising a transmission gate passing the amplified signal from the bitline to an ADC input.

27. The fast settling imaging system of claim 18, wherein the MDP is modified based on a dummy pixel, and wherein each dummy pixel is one of a plurality of dummy pixels in each of a plurality of dummy rows to be used in the pixel array.

* * * * *